US011301617B2

(12) United States Patent
Schmiedehausen

(10) Patent No.: US 11,301,617 B2
(45) Date of Patent: Apr. 12, 2022

(54) SYSTEMS AND METHODS FOR PROVIDING ERROR RECOVERY IN DATA TRANSMISSIONS

(71) Applicant: Zuora, Inc., Redwood City, CA (US)

(72) Inventor: Henning Schmiedehausen, Los Altos, CA (US)

(73) Assignee: Zuora, Inc., Redwood City, CA (US)

( * ) Notice: Subject to any disclaimer, the term of this patent is extended or adjusted under 35 U.S.C. 154(b) by 0 days.

(21) Appl. No.: 16/431,517

(22) Filed: Jun. 4, 2019

(65) Prior Publication Data

US 2019/0370315 A1    Dec. 5, 2019

Related U.S. Application Data

(60) Provisional application No. 62/680,572, filed on Jun. 4, 2018.

(51) Int. Cl.
| | |
|---|---|
| *G06F 40/114* | (2020.01) |
| *H04L 12/24* | (2006.01) |
| *H04L 41/5051* | (2022.01) |
| *G06F 11/07* | (2006.01) |
| *H04L 67/51* | (2022.01) |
| *G06F 9/50* | (2006.01) |
| *H04L 67/55* | (2022.01) |

(52) U.S. Cl.
CPC .......... *G06F 40/114* (2020.01); *G06F 9/5072* (2013.01); *G06F 11/0709* (2013.01); *H04L 41/5051* (2013.01); *H04L 67/16* (2013.01); *H04L 67/26* (2013.01)

(58) Field of Classification Search
CPC . G06F 11/0709; G06F 40/114; H04L 41/5051
See application file for complete search history.

(56) References Cited

U.S. PATENT DOCUMENTS

| | | | |
|---|---|---|---|
| 8,639,625 B1* | 1/2014 | Ginter | G06F 21/51 |
| | | | 705/51 |
| 2003/0191677 A1 | 10/2003 | Akkiraju et al. | |
| 2004/0239981 A1 | 12/2004 | Ducato et al. | |
| 2006/0235831 A1* | 10/2006 | Adinolfi | G06Q 40/00 |
| 2008/0162491 A1 | 7/2008 | Becker et al. | |
| 2009/0083589 A1* | 3/2009 | Fulton | G05B 19/05 |
| | | | 714/48 |
| 2010/0103837 A1* | 4/2010 | Jungck | H04L 63/0227 |
| | | | 370/252 |

(Continued)

*Primary Examiner* — Scott T Baderman
*Assistant Examiner* — Mario M Velez-Lopez
(74) *Attorney, Agent, or Firm* — Sheppard, Mullin, Richter & Hampton LLP

(57) ABSTRACT

Receive a user request to perform a service request associated with user data. Select, based on the user request, a first service provider interface (SPI) integrated into a first service, the first SPI being configured to obtain and buffer the user data from a datastore associated with the first service into a first buffer of the first SPI. Obtain, by the first SPI, a first page of records of the user data from the datastore. Buffer, by the first SPI, the first page of records in the first buffer of the first SPI as the records of the first page of records are being obtained from the datastore. Provide, by the first SPI, the first page of records to a central controller engine. Store, by the central controller engine, the first page of records. Provide the first page of records to a user.

19 Claims, 10 Drawing Sheets

(56) References Cited

U.S. PATENT DOCUMENTS

| | | |
|---|---|---|
| 2010/0169351 A1 | 7/2010 | Kulkarni et al. |
| 2012/0030240 A1 | 2/2012 | Engelhardt et al. |
| 2012/0130973 A1* | 5/2012 | Tamm .................... G06Q 10/00 707/706 |
| 2012/0226811 A1 | 9/2012 | Parmar et al. |
| 2013/0097204 A1* | 4/2013 | Venkataraman ...... G06F 16/252 707/784 |
| 2013/0104150 A1 | 4/2013 | Rdzak et al. |
| 2014/0006441 A1 | 1/2014 | Torman et al. |
| 2014/0075239 A1* | 3/2014 | Prathipati ........... G06F 11/3672 714/4.1 |
| 2015/0280959 A1* | 10/2015 | Vincent ................ G06F 3/0622 709/203 |
| 2016/0065522 A1 | 3/2016 | Vasudev et al. |
| 2016/0267294 A1 | 9/2016 | Weissman et al. |
| 2016/0308963 A1 | 10/2016 | Kung |
| 2016/0316028 A1 | 10/2016 | Sengupta et al. |
| 2017/0091231 A1 | 3/2017 | DiFranco et al. |
| 2019/0095533 A1 | 3/2019 | Levine et al. |
| 2019/0258636 A1 | 8/2019 | Bhattacharjee et al. |

\* cited by examiner

```
┌─────────────────────────────────────────────────────────────────────────┐
│ Selecting, by the central controller engine based on the user request,  │
│ a second service provider interface (SPI) integrated into a second      │
│ service, the second SPI being configured to operate on the second data  │
│ in a second datastore associated with the second service, the second    │
│ SPI including the common pagination component configured to obtain and  │
│ buffer the second data from the second datastore into a second buffer   │
│ of the second service provider interface                          626   │
└─────────────────────────────────────────────────────────────────────────┘
                                    ↓
┌─────────────────────────────────────────────────────────────────────────┐
│ Obtaining, by the common pagination component of the second service     │
│ provider interface based on a second service request of the one or more │
│ service requests, a first page of records of the second data from the   │
│ second datastore                                                  628   │
└─────────────────────────────────────────────────────────────────────────┘
                                    ↓
┌─────────────────────────────────────────────────────────────────────────┐
│ Buffering, by the common pagination component of the second service     │
│ provider interface, the first page of records of the second data in the │
│ first buffer of the second service provider interface as the records of │
│ the first page of records are being obtained from the second datastore  │
│                                                                   630   │
└─────────────────────────────────────────────────────────────────────────┘
                                    ↓
┌─────────────────────────────────────────────────────────────────────────┐
│ Providing, by the common pagination component of the first service      │
│ provider interface, the first page of records of the second data to the │
│ central controller engine                                         632   │
└─────────────────────────────────────────────────────────────────────────┘
                                    ↓
┌─────────────────────────────────────────────────────────────────────────┐
│ Storing, by the central controller engine, the first page of records of │
│ the second data                                                   634   │
└─────────────────────────────────────────────────────────────────────────┘
                                    ↓
┌─────────────────────────────────────────────────────────────────────────┐
│ Providing, by the central controller engine, the first page of records  │
│ of the first data to the user                                     636   │
└─────────────────────────────────────────────────────────────────────────┘
```

FIG. 6C

SYSTEMS AND METHODS FOR PROVIDING ERROR RECOVERY IN DATA TRANSMISSIONS

CROSS-REFERENCE TO RELATED APPLICATIONS

The present application claims the benefit of U.S. Provisional Patent Application Ser. 62/680,572, filed Jun. 4, 2018 and entitled "Multi-Tenant System for Providing Error Recovery in Structured Data Streams," which is hereby incorporated by reference herein. The present application also incorporates by reference U.S. Nonprovisional Application Ser. No. 16/431,544, entitled "Systems and Methods for Providing Uniform Access in a Multi-Tenant System", now U.S. Pat. No. 10,956,243, and U.S. Nonprovisional application Ser. No. 16/431,663, entitled "Multi-Tenant System for Providing Arbitrary Query Support", now U.S. Pat. No. 11,169,998, both of which are being filed on the same date herewith.

TECHNICAL FIELD

This disclosure pertains to data transmissions. More specifically, this disclosure pertains to providing error recovery in data transmissions.

BACKGROUND

Under conventional approaches, data streams may experience transmission errors. For example, network devices (e.g., routers) may fail, open network connections may periodically time-out and/or close, and/or the like. Typically, a failed transmission of a data stream has to be restarted at the beginning of the data stream. This may, for example, result in the retransmission of large amounts of data. In some instances, data streams may have to be restarted from the beginning of the data stream multiple times, and/or may never be successfully completed (e.g., if the amount of data to be streamed is large).

SUMMARY

A claimed solution rooted in computer technology overcomes problems specifically arising in the realm of computer technology. In various embodiments, a multi-tenant computing system (or, simply, multi-tenant system) is configured to receive a user request. The user request may be a request initiated by a tenant (e.g., Verizon) of the multi-tenant system to obtain some or all of their tenant data. For example, the tenant data may include usage data stored in a usage datastore managed by a usage service of the multi-tenant system. The tenant data may also include subscription data stored in a subscription datastore managed by a subscription service of the multi-tenant system. The "services" described herein may be microservices, and/or the services may function and/or be defined differently. For example, the usage service may store and/or access data in one manner (e.g., as defined by a specification for the usage service), and the subscription service may store and/or access data in another manner (e.g., as defined by a specification for the subscription service). In order for the multi-tenant system to access the different services, and/or the data associated with those services, in a uniform manner, each of the services may include a service provider interface. In some embodiments, the multi-tenant system may provide the same service provider interface to each of the different services, and the service provider interfaces may only require minimal modification to function with a particular service. For example, the modification may include defining locations of datastores and/or data formats for the datastore (e.g., object-based, relational, flat-file). Accordingly, modifying the service provider interface for a particular service may only include adding or modifying two or three lines of code within the service provider interface. The remaining portions of the service provider interface may be common across all of the service provider interface for the various services of the multi-tenant system.

In some embodiments, each of the service provider interfaces may be defined by the multi-tenant system according to a uniform access specification. For example, the uniform access specification may define a format for data output from services, a format for data input to services, and/or the like. In this manner, requests may be provided to services in a uniform manner, and data may be consumed from services in a uniform manner, regardless of how the services handle that data within the services themselves (and/or the datastores associated with the services). This solution may be more scalable than traditional solutions, for example, at least because the service provider interfaces may be maintained by their respective services and/or associated development teams. The multi-tenant system may provide requests and consume data in a uniform manner, without having to maintain a large "glue layer" that is implemented independent of the services. As more services are added, the same service provider interfaces may be deployed, and then implemented by the added services with minimal modification.

In some embodiments, the multi-tenant system is configured to perform real-time pagination. Real-time pagination may provide improved error recovery for a failed data transmission by allowing the data transmission to be reinitiated at a current page of the data transmission (e.g., page 55) as opposed to the beginning of the data transmission. In some embodiments, a service provider interface writes pages of data in real-time (e.g., as opposed to having pre-generated pages) by buffering data from the datastore of the service into a buffer of the service provider interface. The service may stream the data from the datastore of the service to the buffer of the service provider interface. A receiver (e.g., a central controller engine of the multi-tenant system) may pull (or, fetch) pages from the service provider interface. For example, the receiver may periodically provide a request to the service provider interface. If the buffer is full (e.g., the page has been completely written), and/or if the service request has been satisfied (e.g., all of the usage data has been obtained from the datastore, and all of the usage data amounts to less than a full page), the service provider interface may allow the data to be fetched from the buffer and stored in a datastore of the receiver. Once the receiver begins fetching the data from the service provider interface, the service provider interface may begin writing a second page of records into a second buffer of the service provider interface. When the receiver has received all of the records of the first page, it may send a request to fetch the records of the second page from the second buffer of the service provider interface. If an error occurs, for example, in the data transmission of a second page of records between the service provider interface and the receiver, the data transmission may be reinitiated at the second page, as opposed to the beginning of the data transmission (e.g., the first page of records).

The receiver may also begin streaming a page of records to a user (e.g., the tenant) when the receiver has successfully received the page of records. Accordingly, from the user's perspective, the user appears to be receiving a stream of data from the service, and the intermediate fetches are not apparent to the user.

Various embodiments of the present disclosure include systems, methods, and non-transitory computer readable media configured to receive, by a central controller engine, a user request to perform one or more service requests associated with user data, wherein the user data includes first data. Select, by the central controller engine based on the user request, a first service provider interface (SPI) integrated into a first service, the first SPI being configured to operate on the first data in a first datastore associated with the first service, the first SPI including a common pagination component configured to obtain and buffer the first data from the first datastore into a first buffer of the first service provider interface. Obtain, by the common pagination component of the first service provider interface based on a first service request of the one or more service requests, a first page of records of the first data from the first datastore. Buffer, by the common pagination component of the first service provider interface, the first page of records in the first buffer of the first service provider interface as the records of the first page of records are being obtained from the first datastore. Provide, by the common pagination component of the first service provider interface, the first page of records of the first data to the central controller engine. Store, by the central controller engine, the first page of records of the first data. Provide, by the central controller engine, the first page of records of the first data to a user.

In some embodiments, the first page of records of the first data is provided to the central controller engine by the common pagination component of the first service provider interface in response to a first fetch request from the central controller engine, and when the first buffer of the first service provider interface is full or when the first service request is satisfied.

In some embodiments, the systems, methods, and non-transitory computer readable media are further configured to obtain, by the common pagination component of the first service provider interface based on the first service request of the one or more service requests, a second page of records of the first data from the first datastore; buffer, by the common pagination component of the first service provider interface, the second page of records in the second buffer of the first service provider interface as the records of the second page of records are being obtained from the first datastore; provide, by the common pagination component of the first service provider interface, the second page of records of the first data to the central controller engine; store, by the central controller engine, the second page of records of the first data; and provide, by the central controller engine, the second page of records of the first data to the user.

In some embodiments, the second page of records of the first data is provided to the central controller engine by the common pagination component of the first service provider interface in response to a second fetch request from the central controller engine, and when the first buffer of the first service provider interface is full or when the first service request is satisfied.

In some embodiments, the second fetch is based on an identifier of the second buffer of the first service provider interface, the identifier being included in the first page of records.

In some embodiments, the obtaining, by the common pagination component of the first service provider interface based on a first service request of the one or more service requests, the first page of records of the first data from the first datastore comprises pushing, by the first service, the first page of records of the first data from the first datastore to the first buffer of the first service provider interface. In some embodiments, the pushing comprises streaming.

In some embodiments, the providing, by the common pagination component of the first service provider interface, the first page of records of the first data to the central controller engine comprises pulling, by the central controller engine, the first page of records of the first data from the first buffer of the first service provider interface to a datastore of the central controller engine.

In some embodiments, the providing, by the common pagination component of the first service provider interface, the first page of records of the first data to the central controller engine comprises pulling, by the central controller engine, the first page of records of the first data from the first buffer of the first service provider interface to a datastore of the central controller engine.

In some embodiments, the systems, methods, and non-transitory computer readable media are further configured to detect an error associated with the first service request; and reinitiate the providing, by the common pagination component of the first service provider interface, the second page of records of the first data to the central controller engine.

In some embodiments, the systems, methods, and non-transitory computer readable media are further configured to select, by the central controller engine based on the user request, a second service provider interface (SPI) integrated into a second service, the second SPI being configured to operate on the second data in a second datastore associated with the second service, the second SPI including the common pagination component configured to obtain and buffer the second data from the second datastore into a second buffer of the second service provider interface; obtain, by the common pagination component of the second service provider interface based on a second service request of the one or more service requests, a first page of records of the second data from the second datastore; buffer, by the common pagination component of the second service provider interface, the first page of records of the second data in the first buffer of the second service provider interface as the records of the first page of records are being obtained from the second datastore; provide, by the common pagination component of the first service provider interface, the first page of records of the second data to the central controller engine; store, by the central controller engine, the first page of records of the second data; and provide, by the central controller engine, the first page of records of the first data to the user.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

services of a multi-tenant system to multiple tenants according to some embodiments of the present invention.

Figure 2:
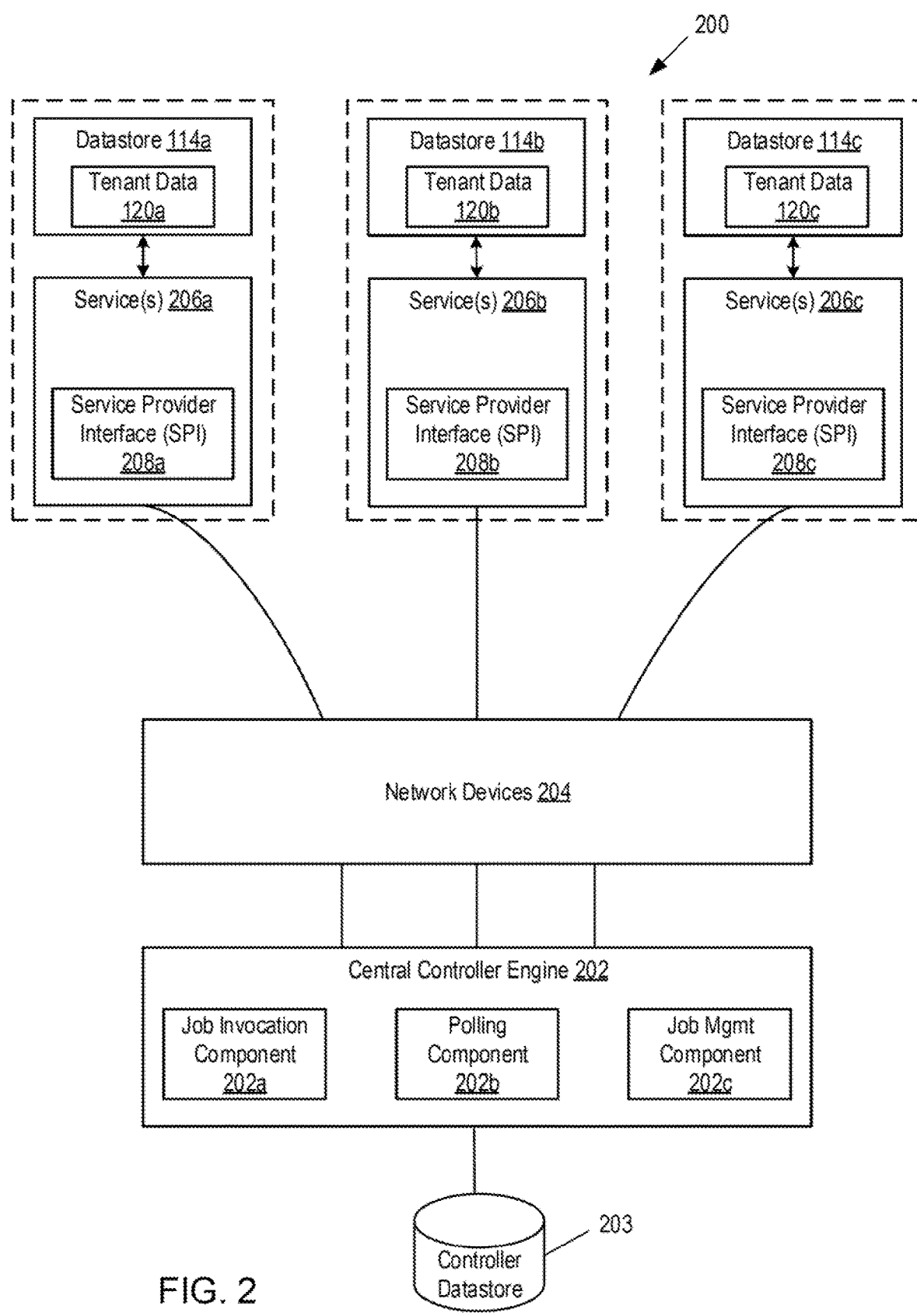

FIG. 2 depicts a diagram of an example portion of a multi-tenant system for enabling uniform access to data in disparate datastores and/or disparate services according to some embodiments.

Figure 3:
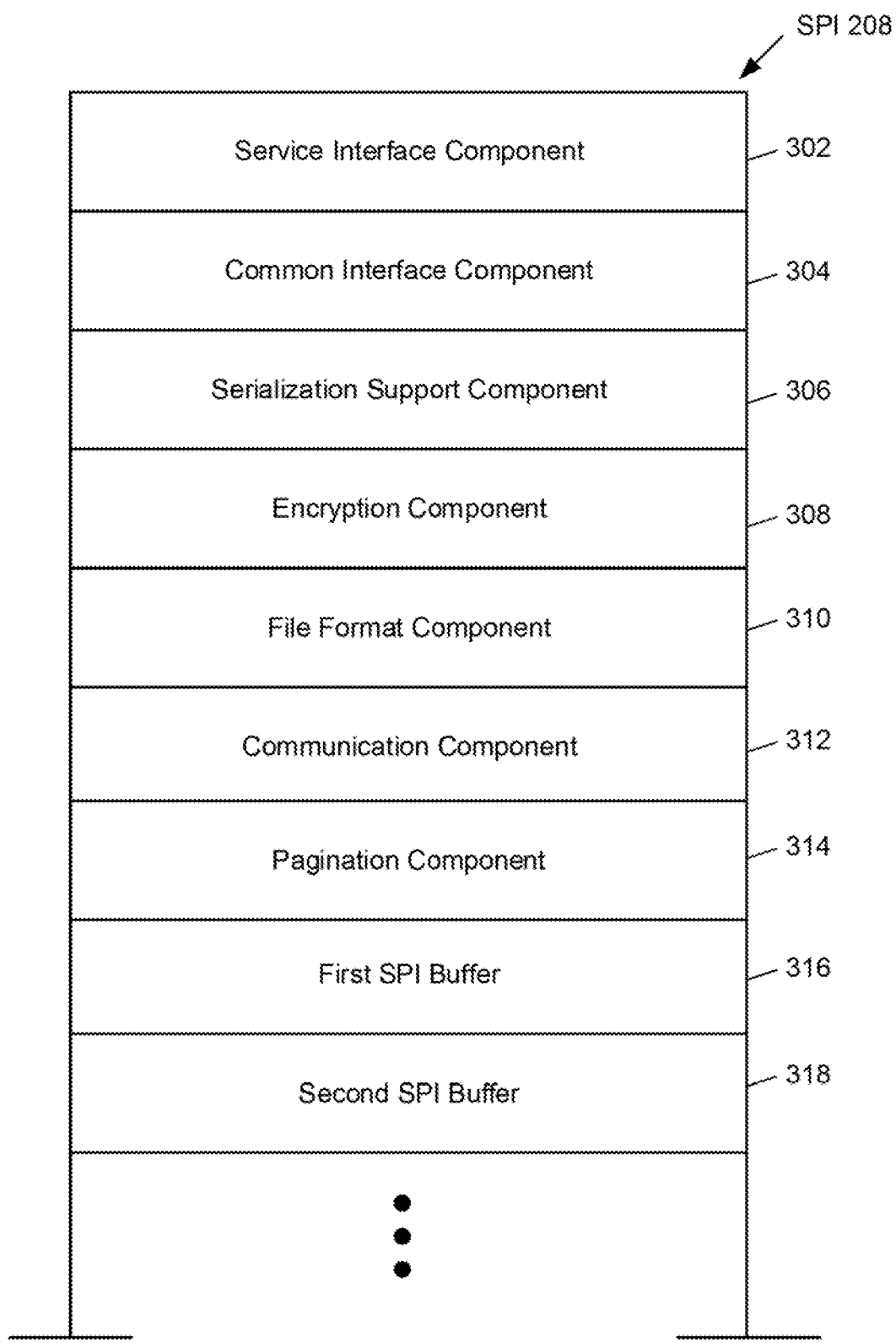

FIG. 3 depicts a diagram of an example service provider interface (SPI) according to some embodiments.

Figure 4:
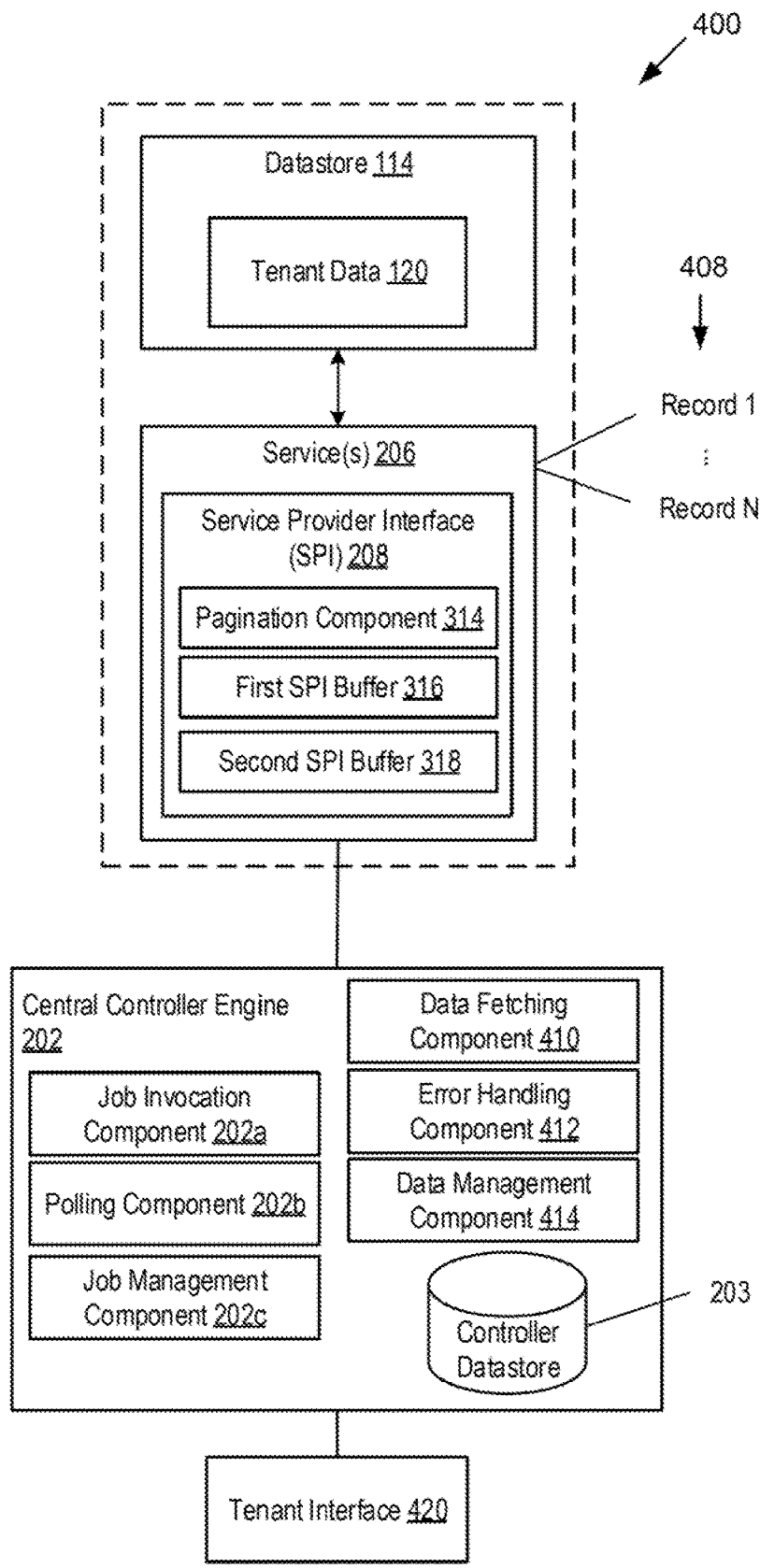

FIG. 4 depicts a diagram of an example portion of a multi-tenant system enabling real-time pagination and error recovery in a data transmission according to some embodiments.

Figure 5A:
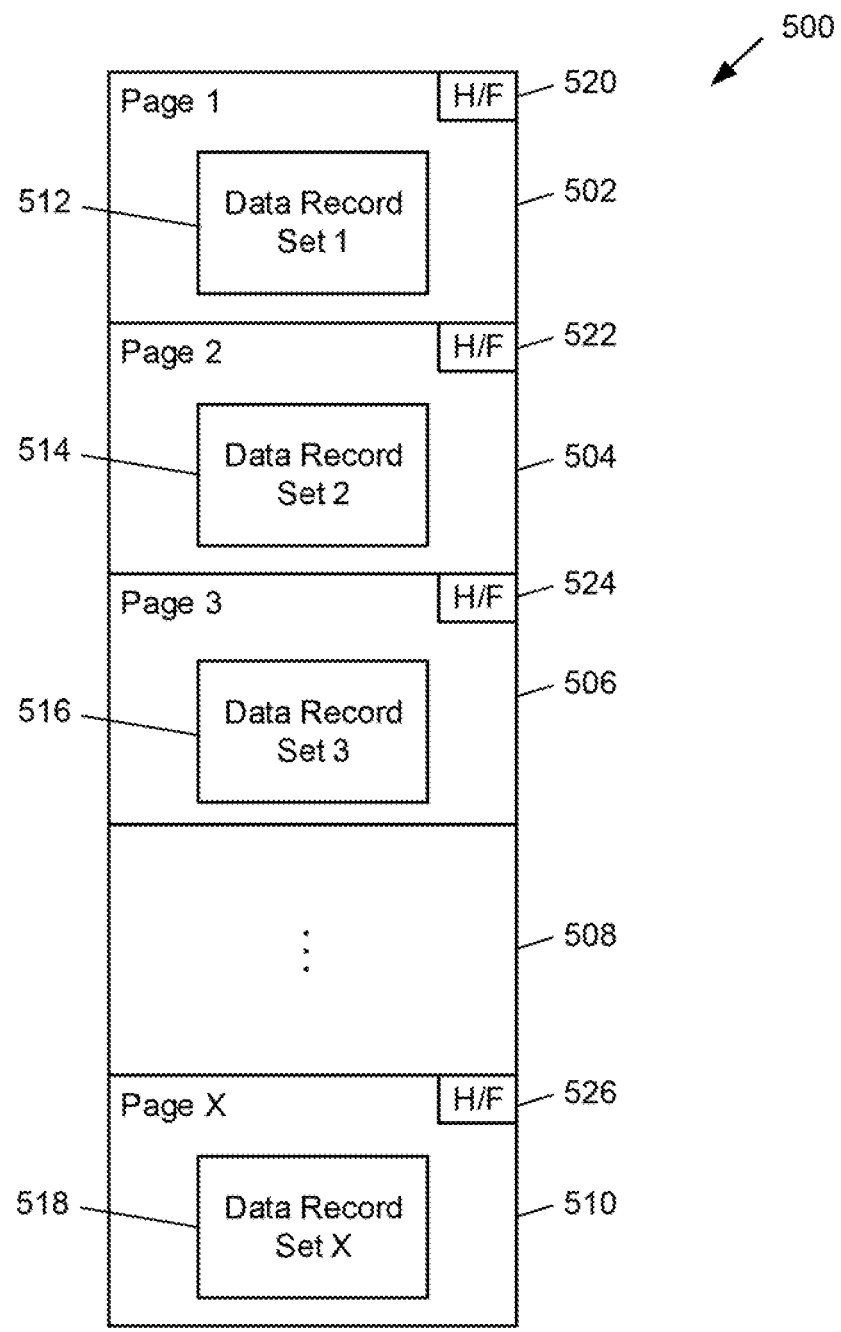

FIG. 5A depicts a diagram of example paginated record sets ready for transmission to a central controller engine of a multi-tenant system according to some embodiments.

Figure 5B:
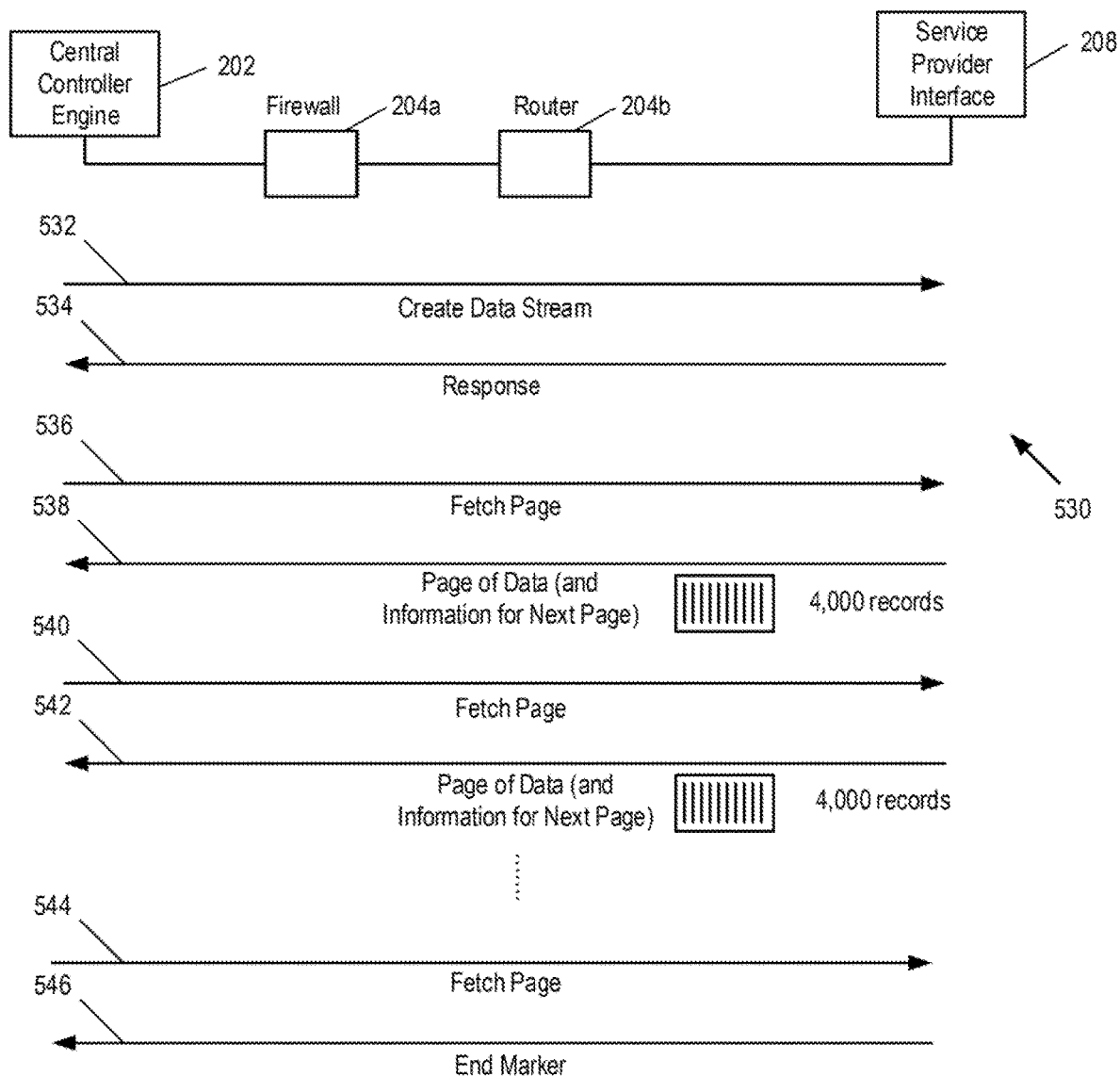

FIG. 5B depicts a flowchart of an example of a method of real-time paginated record transmission in a multi-tenant system according to some embodiments.

Figure 6A:
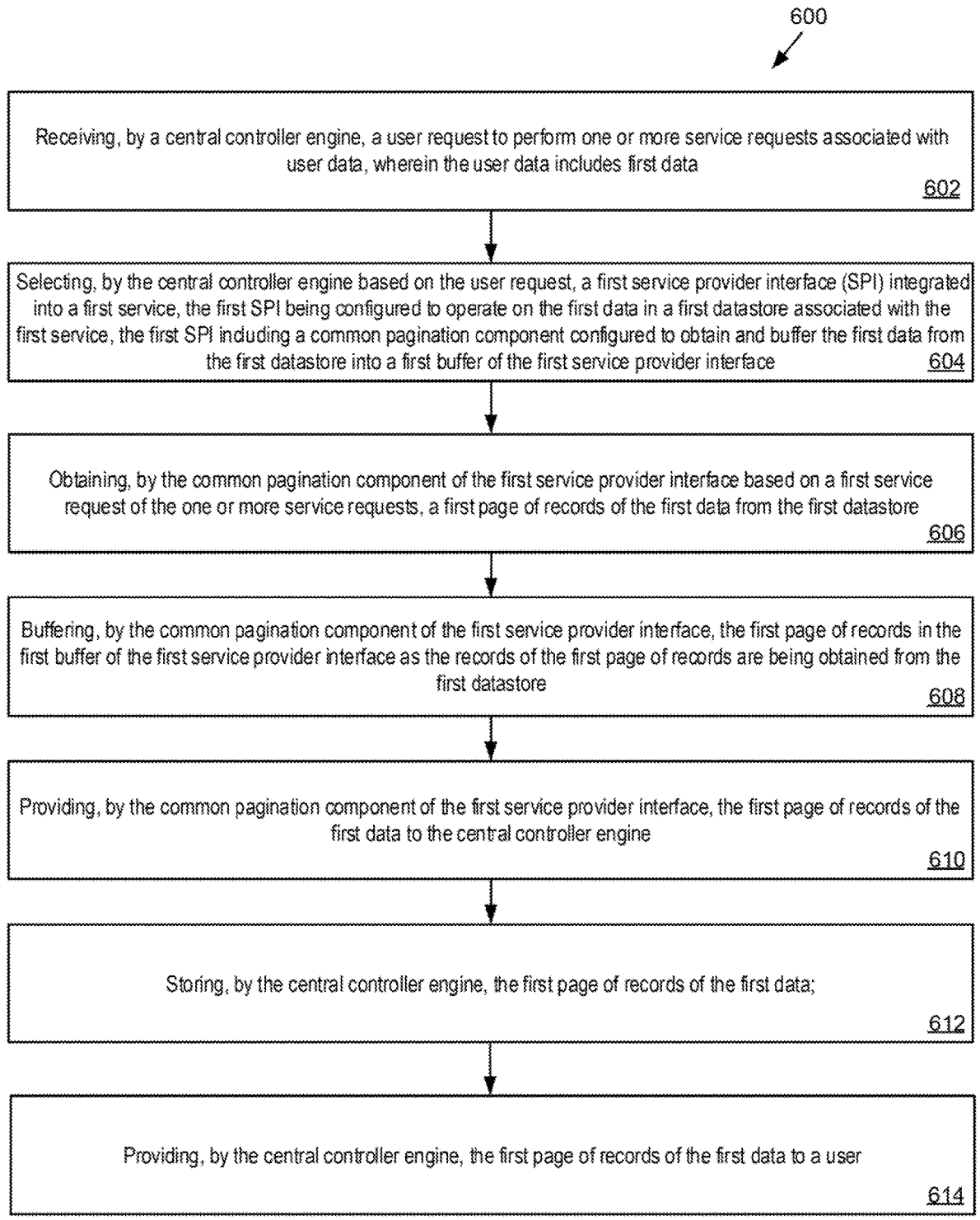
Figure 6B:
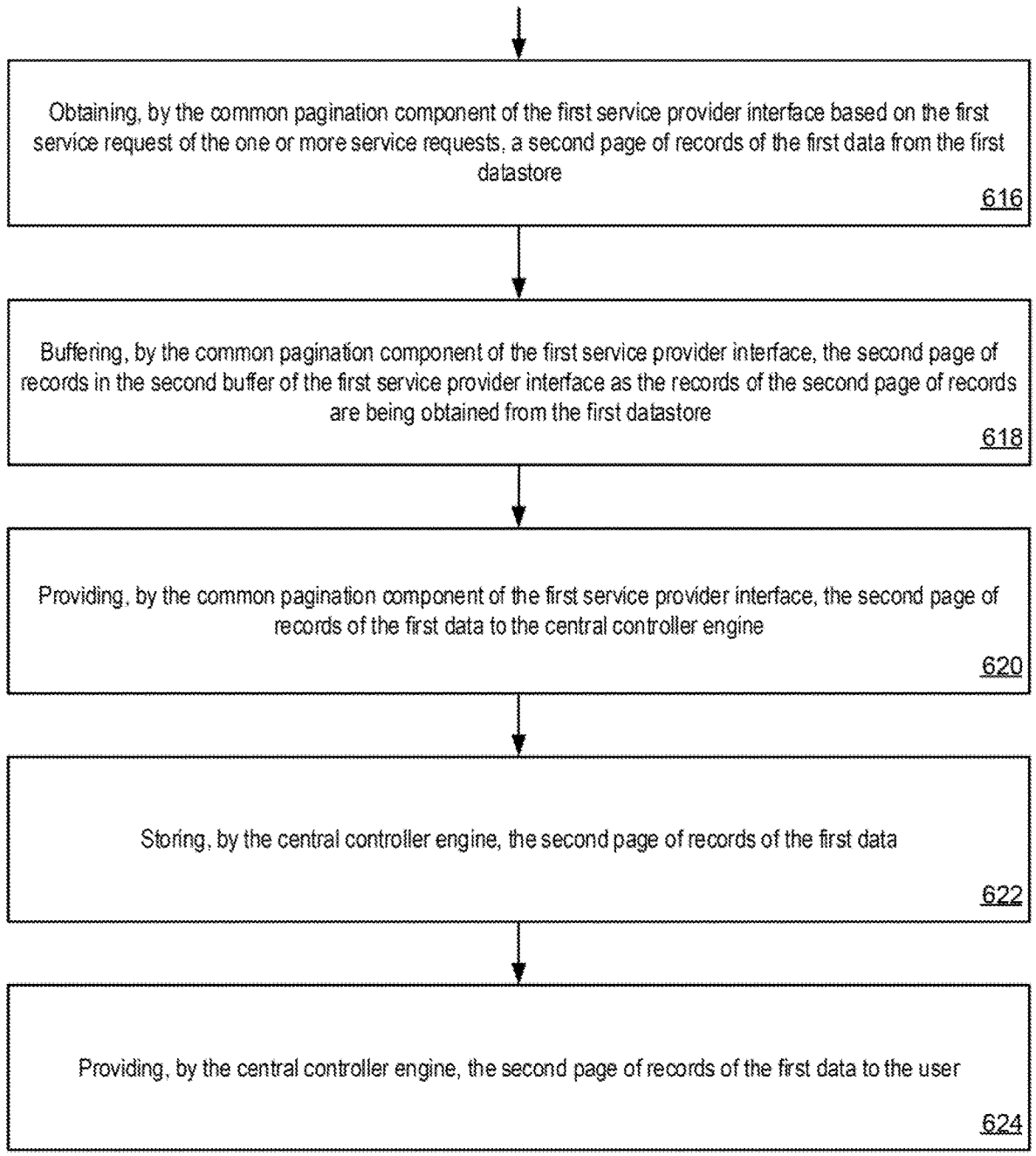

FIGS. 6A-C depict a flowchart of an example of a method of real-time paginated record transmission in a multi-tenant system according to some embodiments.

Figure 7:
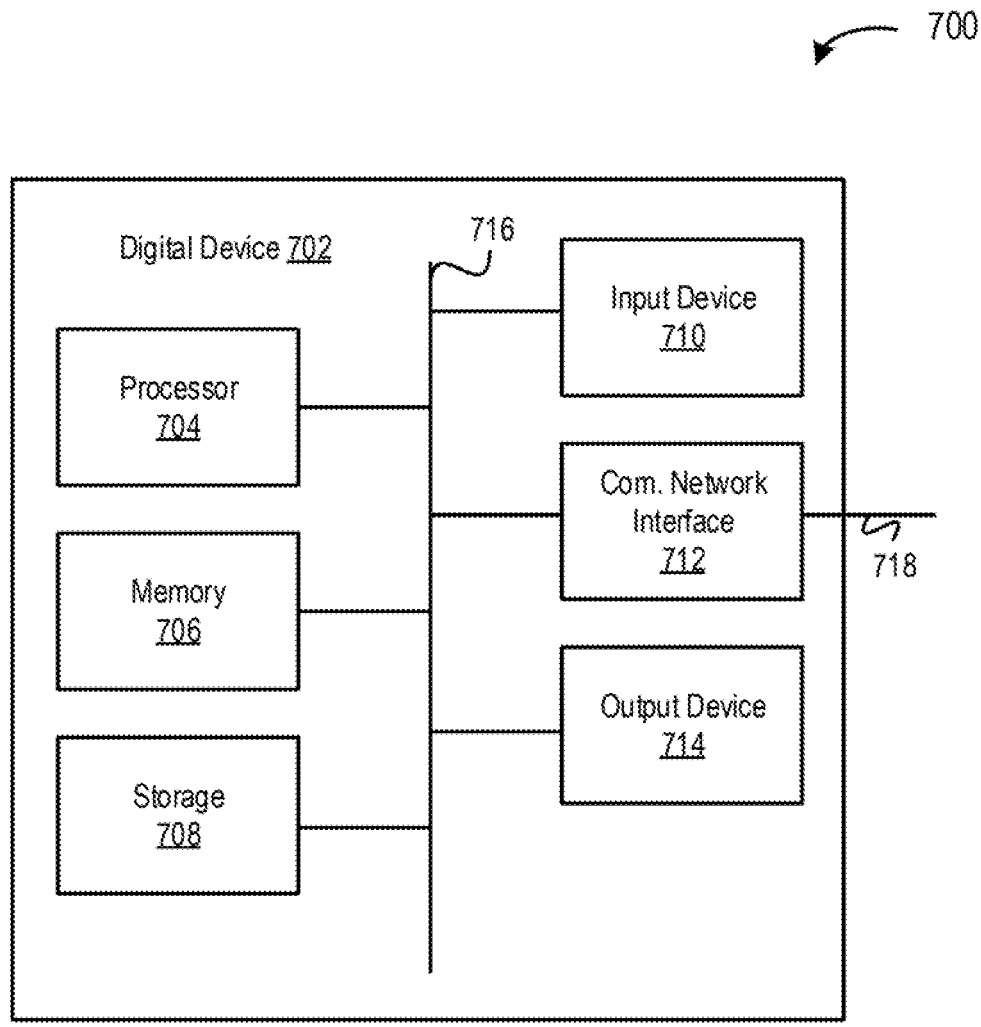

FIG. 7 is a diagram of an example computer system for implementing the features disclosed herein according to some embodiments.

DETAILED DESCRIPTION

A claimed solution rooted in computer technology overcomes problems specifically arising in the realm of computer technology. In various embodiments, a multi-tenant computing system (or, simply, multi-tenant system) is configured to receive a user request. The user request may be a request initiated by a tenant (e.g., Verizon) of the multi-tenant system to obtain some or all of their tenant data. For example, the tenant data may include usage data stored in a usage datastore managed by a usage service of the multi-tenant system. The tenant data may also include subscription data stored in a subscription datastore managed by a subscription service of the multi-tenant system. The "services" described herein may be microservices, and/or the services may function and/or be defined differently. For example, the usage service may store and/or access data in one manner (e.g., as defined by a specification for the usage service), and the subscription service may store and/or access data in another manner (e.g., as defined by a specification for the subscription service). In order for the multi-tenant system to access the different services, and/or the data associated with those services, in a uniform manner, each of the services may include a service provider interface. In some embodiments, the multi-tenant system may provide the same service provider interface to each of the different services, and the service provider interfaces may only require minimal modification to function with a particular service. For example, the modification may include defining locations of datastores and/or data formats for the datastore (e.g., object-based, relational, flat-file). Accordingly, modifying the service provider interface for a particular service may only include adding or modifying two or three lines of code within the service provider interface. The remaining portions of the service provider interface may be common across all of the service provider interface for the various services of the multi-tenant system.

In some embodiments, each of the service provider interfaces may be defined by the multi-tenant system according to a uniform access specification. For example, the uniform access specification may define a format for data output from services, a format for data input to services, and/or the like. In this manner, requests may be provided to services in a uniform manner, and data may be consumed from services in a uniform manner, regardless of how the services handle that data within the services themselves (and/or the datastores associated with the services). This solution may be more scalable than traditional solutions, for example, at least because the service provider interfaces may be maintained by their respective services and/or associated development teams. The multi-tenant system may provide requests and consume data in a uniform manner, without having to maintain a large "glue layer" that is implemented independent of the services. As more services are added, the same service provider interfaces may be deployed, and then implemented by the added services with minimal modification.

In some embodiments, the multi-tenant system is configured to perform real-time pagination. Real-time pagination may provide improved error recovery for a failed data transmission by allowing the data transmission to be reinitiated at a current page of the data transmission (e.g., page 55) as opposed to the beginning of the data transmission. In some embodiments, a service provider interface writes pages of data in real-time (e.g., as opposed to having pre-generated pages) by buffering data from the datastore of the service into a buffer of the service provider interface. The service may stream the data from the datastore of the service to the buffer of the service provider interface. A receiver (e.g., a central controller engine of the multi-tenant system) may pull (or, fetch) pages from the service provider interface. For example, the receiver may periodically provide a request to the service provider interface. If the buffer is full (e.g., the page has been completely written), and/or if the service request has been satisfied (e.g., all of the usage data has been obtained from the datastore, and all of the usage data amounts to less than a full page), the service provider interface may allow the data to be fetched from the buffer and stored in a datastore of the receiver. Once the receiver begins fetching the data from the service provider interface, the service provider interface may begin writing a second page of records into a second buffer of the service provider interface. When the receiver has received all of the records of the first page, it may send a request to fetch the records of the second page from the second buffer of the service provider interface. If an error occurs, for example, in the data transmission of a second page of records between the service provider interface and the receiver, the data transmission may be reinitiated at the second page, as opposed to the beginning of the data transmission (e.g., the first page of records).

The receiver may also begin streaming a page of records to a user (e.g., the tenant) when the receiver has successfully received the page of records. Accordingly, from the user's perspective, the user appears to be receiving a stream of data from the service, and the intermediate fetches are not apparent to the user.

Figure 1:
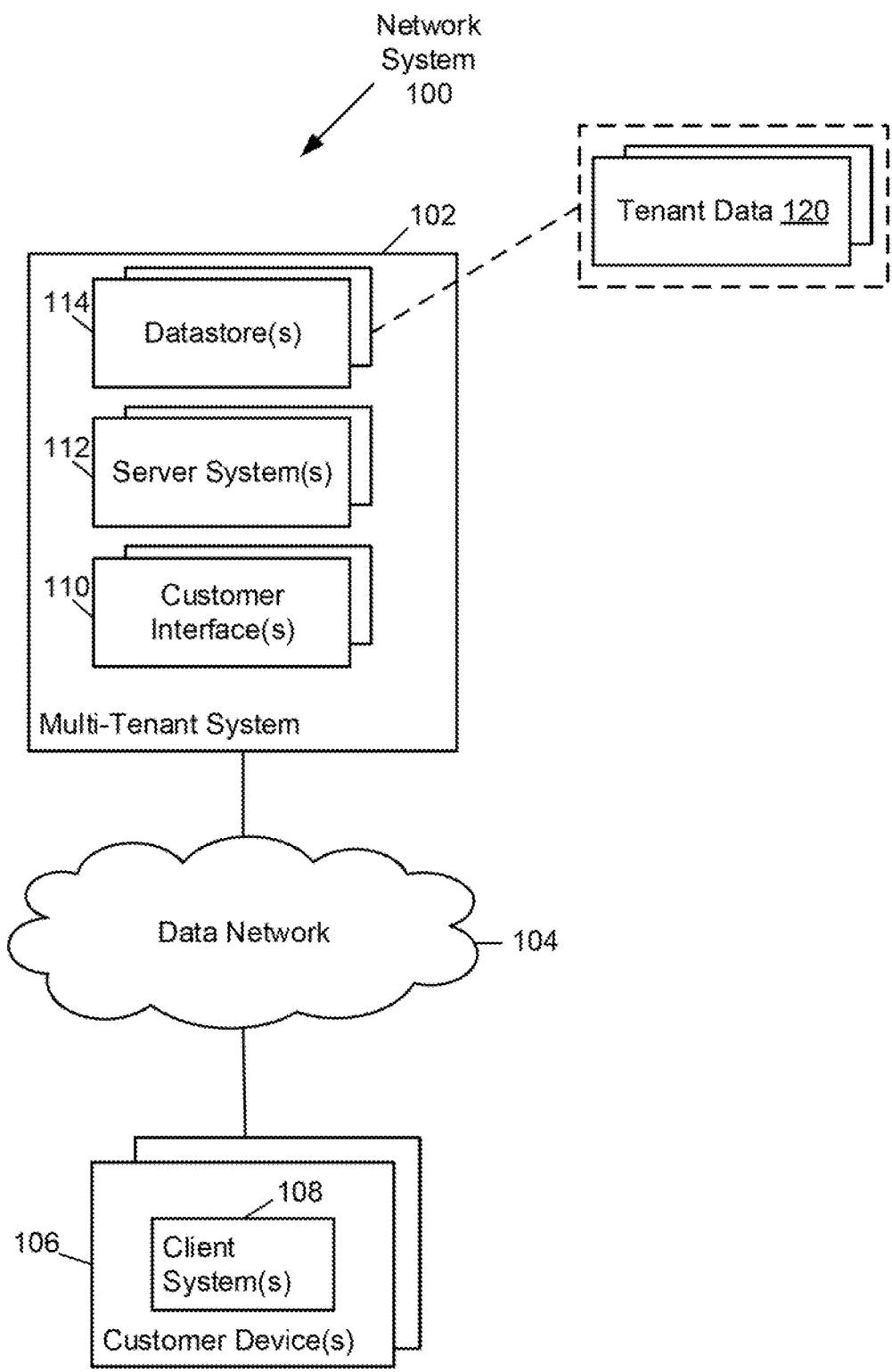
FIG. 1 depicts a diagram of an example network system for providing cloud-based software-as-a-service (SAAS)

FIG. 1 depicts a diagram of an example network system 100 for providing cloud-based software-as-a-service (SAAS) services of a multi-tenant system 102 to multiple tenants according to some embodiments. Examples of the cloud-based SAAS services include data storage, data processing, and business-oriented applications. In some embodiments, each tenant may be a subscription-based entity or provider (e.g., an internet service provider, a home security system and service provider, a cellular phone service provider, or entertainment content provider). Each tenant may include a group of one or more users (e.g., individuals, business entities, customers of the business entities, systems) who share access to the cloud-based services. In one embodiment, a tenant includes a service entity such as AT&T, Netflix, Verizon, and/or the like. A tenant may include one or more products or services of an entity. For example, AT&T internet products may be a particular tenant, and AT&T security products may be another tenant. In some embodiments, the cloud-based SAAS services relate to managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources to host the cloud-based SAAS services to the tenants. The shared resources may include processors, memory, virtual systems, services, application programs, load balancers, firewalls, and/or the like. As shown, the multi-tenant system 102 includes tenant interfaces 110, server systems 112, and datastores 114. Each of the client devices 106 includes a client system 108 that accesses the cloud-based SAAS services hosted by the multi-tenant system 102. In some embodiments, the client systems 108 may be operated by employees (e.g., administrator users) of the provider of the provider of the multi-tenant system 102. In some embodiments, the client systems 108 may be operated by employees of the tenant. In some embodiments, the client systems 108 may be operated by end users of the tenant's services.

Each client device 106 may include a desktop, laptop, notebook, tablet, personal digital assistant, smart phone, or other consumer electronic devices incorporating one or more computer components. The client system 108 on each client device 106 may include hardware, software and/or firmware for communicating with the multi-tenant system 102 and accessing the cloud-based services it hosts. Examples of the client systems 108 may include web browsers, client engines, drivers, user interface components, proprietary interfaces, and/or the like.

The multi-tenant system 102 includes hardware, software and/or firmware to host the cloud-based services for the tenants. It will be appreciated that the typical multi-tenant system 102 may offer access to shared resources including systems and applications on shared devices and offer each tenant the same quality or varying qualities of service. In some embodiments, the multi-tenant system 102 does not use virtualization or instantiation processes. In some embodiments, a multi-tenant system 102 integrates several business computing systems into a common system with a view toward streamlining business processes and increasing efficiencies on a business-wide level.

In some embodiments, the multi-tenant system 102 includes a user interface tier of multiple tenant interfaces 110, a server tier of multiple server systems 112, and a datastore tier of multiple datastores 114 for the multiple tenants. In some embodiments, the tenant interfaces 110 includes graphical user interfaces and/or web-based interfaces to enable tenants to access the shared services hosted by the multi-tenant system 102. The tenant interfaces 110 may support load balancing when multiple tenants (and/or multiple customers of the tenants) try to access the multi-tenant system 102 concurrently. The tenant interfaces 110 may additionally or alternatively include an operator interface for use by a systems operator to configure or otherwise manage the multi-tenant system 102. In some embodiments, each tenant may be associated with a subset of the total tenant interfaces 110 for load balancing.

In some embodiments, the server systems 112 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, and/or the like. Similar to the tenant interfaces 110, in some embodiments, the server systems 110 may support load balancing when multiple tenants (and/or multiple customers of tenants) try to access the multi-tenant system 102 concurrently. Further, in some embodiments, each tenant may be associated with a subset of the total server systems 112 for load balancing.

In some embodiments, tenant data 120 for each tenant may be stored in a logical store across one or more datastores 114. In some embodiments, each tenant uses a logical store that is not assigned to any predetermined datastores 114. Each logical store may contain tenant data 120 that is used, generated and/or stored as part of providing tenant-specific business services or functions. In some embodiments, the datastores 114 may include relational database management systems (RDBMS), object-based database systems, and/or the like. In some embodiments, tenant data 120 may be stored across multiple datastores 114, with each datastore dedicated to a particular service (e.g., managing customer records, managing product and/or service consumption information, managing billing information, managing payment information, and/or the like).

In some embodiments, the tenant data 120 may include subscription information, such as billing data and/or subscription status (e.g., active, canceled, suspended, re-activated). Billing data may include billing invoice data (e.g., date of invoices and invoice amounts, overage charge dates and overage charge amounts), payment transaction data (e.g., date of payments, amount of payments), payment methods (e.g., credit card, debit card), payment plan (e.g., annual billing, monthly billing), and/or service plan information (e.g., the name of a service plan). Subscription information may also include a geographic region and/or location associated with a tenant, service, and/or subscriber. In some embodiments, the tenant data 120 may include usage data (e.g., account activity data), such as new subscriptions, changes to subscribed products and/or services, cancellation of one or more products and/or services, subscriptions to new products and/or services, application of discounts, loyalty program package changes (e.g., additional programs and/or services, special rates, and/or the like for loyal customers), reduction or increase of rates for products and/or services, and/or cancellation of the application. In some embodiments, account activity may include usage of a product and/or product of a subscriber (e.g., what channels the subscriber actually watches, what services and what level of consumption the subscriber receives, quality of the product and/or services, and/or the like).

In some embodiments, the tenant data 120 may be stored in one or more data formats (or, simply, formats). For example, subscription tenant data may be stored in a particular format, and usage tenant data may be stored in another format. As used herein, formats may include data types, variable types, protocols (e.g., protocols for accessing, storing, and/or transmitting data), programming languages, scripting languages, data value parameters (e.g., date formats, string lengths), endpoint locations and/or types, and/or the like.

In some embodiments, the multi-tenant system 102 functions to provide uniform access to disparate services (e.g., microservices) and/or disparate datastores. For example, different services of the multi-tenant system 102 may manage (e.g., create, read, update, delete) tenant data 120 stored in different datastores 114. It will be appreciated that as used herein, a "service" may be single service and/or a set of services (e.g., a cluster of services). The datastores 114 may store data in different formats, and/or the services may handle data differently. The services may each include a service provider interface (SPIs) that provides data from the service, and/or receives data at the service, in a common (or, uniform) format, regardless of the original format that may be used by the service and/or datastores 114. In some embodiments, the multi-tenant system 102 may define a uniform access specification that defines the common format that the services must comport with when receiving and/or providing data. For example, each service may include a service provider interface, and communication with the service may be performed through the service provider interface. Accordingly, each of the services may be accessed in a uniform manner, and data may be consumed from the services in a uniform manner, regardless of the internal specifications and/or operations of the service.

In some embodiments, the multi-tenant system 102 functions to provide real-time pagination (or, simply, pagination) of tenant data 120. Pagination may provide improved error recovery for a failed data transmission by allowing the data transmission to be reinitiated at a current page of the data transmission (e.g., page 55) as opposed to the beginning of the data transmission.

The data network (or, communication network) 104 may represent one or more computer networks (e.g., LAN, WAN, or the like) or other transmission mediums. The data network 104 may provide communication between the systems, engines, datastores, components, and/or devices described herein. In some embodiments, the data network 104 includes one or more computing devices, routers, cables, buses, and/or other network topologies (e.g., mesh, and the like). In some embodiments, the data network 104 may be wired and/or wireless. In various embodiments, the data network 104 may include the Internet, one or more wide area networks (WANs) or local area networks (LANs), one or more networks that may be public, private, IP-based, non-IP based, and so forth.

FIG. 2 depicts a diagram of an example portion 200 of a multi-tenant system 102 for enabling uniform access to data in disparate datastores 114 and/or disparate services 206 according to some embodiments. In the example of FIG. 2, the example portion 200 of the multi-tenant system 102 includes a central controller engine 202, network devices 204, services 206a to 206c (individually, the service 206, collectively, the services 206), service provider interfaces (SPIs) 208 (individually, the service provider interface 208, collectively, the service provider interfaces 208), and datastores 114a to 114c (individually, the datastore 114, collectively, the service provider datastores 114). The three datastores 114 may each be respectively managed by the three sets of one or more services 206, and each respectively made accessible in a uniform manner by the service provider interfaces (SPIs) 208. In some embodiments, the central controller engine 202, which may support internal or tenant communications, is coupled via network devices 204 with the datastores 114. The network devices 204 may include routers, load balancers, firewalls, and/or the like. Although only three services 206, three service provider interfaces 208, and three datastores 114 are shown here, it will be appreciated that the multi-tenant system 102 may support a greater or lesser number of such services 206, service provider interfaces 208, and/or datastores 114.

As discussed herein, the multi-tenant system 102 distributes tenant data across multiple datastores 114 at multiple locations. As shown, the multi-tenant system distributes tenant data across at least datastores 114a, 114b and 114c. The multi-tenant system 102 may include one or more services, shown as services 206a, 206b and 206c, to respectively manage the tenant data at each datastore 114 through one or more application program interfaces (APIs). APIs are typically designed to be specific to the purpose of the service it supports and may differ widely in the exposed capabilities and performance. For example, in some systems, each of the different datastores 114 and each of the different services 206 may be developed independently of one another and possibly by different development teams. Accordingly, it is common that the API calls are non-uniform.

To solve the nonuniformity, the system could incorporate a "glue" layer, e.g., an enterprise service bus or a service-oriented architecture (SOA layer) that access data via the APIs and exposes it to the consumers. Glue layers typically access data directly from the datastore, bypassing the services with their different APIs. Glue layers have been found to be brittle, needing to be matched continuously to changing APIs that the services expose. Further, direct database access often violates data integrity guarantees or service level agreements that a service is trying to offer. Further, data exposed directly from the database often has a different shape than the data exposed at API level. Data exposed directly from the database therefore requires extensive transformation to match the data shape of that received at the API level. API enforcement through code or process is often inconsistent, which often results in multiple incompatible implementations. By putting these requirements on the software development process, the resulting APIs may only be "lowest common denominator" APIs instead of matching the desired use cases for the services.

To enable uniform access to the services 206 and the tenant data 120 stored in the datastores 114, in some embodiments, the multi-tenant system 102 includes a software component embedded directly (or, integrated) into the services 206. In other embodiments, the software component may be hooked into the services 206, as opposed to embedded directly into the services 206. This software component, referred to herein as a service provider interface (SPI) 208a, 208b and 208c respectively, may be delivered as a library to a service development team for integration into the services 206 to make their services compatible, without having to change their APIs or expose internal details of their database. With the service provider interface 208 integrated into the services 206, the multi-tenant system 102 enables access to diverse data services in a uniform manner without having to build extensive glue layers between services, the consumers, and/or other features of the multi-tenant system 102. Each of the services 206 may enable access to the diverse data services without exposing their internal data organization and/or without bypassing the services 206. Development teams can use the service provider interfaces 208 to allow access to the data exposed by the services 206 in a uniform manner, and also provide data in a uniform manner, regardless of the internal formats and specification used by the service.

In the example of FIG. 2, the central controller engine 202 includes a job invocation component 202a, a polling component 202b, a job management component 202c. The job invocation component 202a may function to receive user requests (or, tenant requests). User requests may include export requests, import requests, and/or the like. For example, a request may include a request from a tenant to obtain some or all of the their tenant data 120. User requests may be received in a variety of different formats. For example, requests may be obtained in tenant formats (e.g., a Verizon format, an AT& format).

In some embodiments, the job invocation component 202a may function to identify and/or select service provider interfaces 208. In some embodiments, the job invocation component 202a may function to identify and/or select service provider interfaces 208 based on user requests. For example, the job invocation component 202a may store a topology of the services (e.g., in a file stored in the controller datastore 203). The topology of the services may also be maintained by another service, and the job invocation component 202a may query that other service for a current topology. The topology may indicate locations (e.g., an endpoint location) of service provider interfaces 208 and/or services 206. In some embodiments, the job invocation component 202a may parse a user request, and identify the services 206 to process the request based on the topology. For example, the job invocation component 202a may parse an extract request for usage data and subscription data, and identify the location of the service provider interface 208 for the usage service based on the topology, and the location of the service provider interface 208 for the subscription service based on the topology.

In some embodiments, the job invocation component 202a functions to provide (e.g., generate and/or transmit) service requests. For example, the job invocation component 202a may provide a service request based on a user request and a selected service provider interface 208. In some embodiments, the service request may be in a common format. For example, the job invocation component 202a may provide service requests based on a uniform access specification. The uniform access specification may define one or more common protocols, data formats, programming languages, endpoints, and/or the like, for communication between the services 206, the central controller engine 202, and/or other elements of the multi-tenant system 102. For example, the uniform access specification may define output format requirements for data output from the services 206, and input format requirement for the services 206.

In some embodiments, the job invocation component 202a functions to receive and/or provide information (e.g., in addition to user requests and/or service requests). For example, the job invocation component 202a may receive a request result, and provide the request results to another system and/or user (e.g., a tenant user). The request results may be in a common format (e.g., based on the service provider interface 208 and/or uniform access specification), regardless of which service 206 provided to the data. For example, a request result may include usage data and subscription data in a common format.

The polling component 202b may function to query services 206 to determine a status of jobs (e.g., service requests) and/or services 206. A status may include a completion status (e.g., 56% complete) of a job, and/or whether the service 206 is responsive or has timed-out. For example, the polling component 202b may query (e.g., poll) a usage service 206 to the determine the status of a request to obtain (e.g., fetch, pull, push) usage data for a particular tenant of the multi-tenant system 102. The polling component 202b may determine if a service has failed if query attempt fail.

The job management component 202c may function to maintain state information (or, simply, "state") of jobs, services 206, and/or the central controller engine 202. This may be more resilient than maintaining states at each of the services, and avoid having to perform state reconciliation. In some embodiments, the job management component 202c may store state information in the controller datastore 203. For example, state information may include the associated service request, a status of the service status, a status of the service request, and/or the like. If a service has failed (e.g., as determined by the polling component 202b), the job management component 202c may relaunch the failed according to the state information. Similarly, if the central controller engine 202 has recently relaunched (e.g., in response to failure of the central controller engine 102), the job management component 202c may relaunch services based on the state information.

FIG. 3 depicts a diagram of an example service provider interface (SPI) 208 according to some embodiments. Generally, under some approaches (e.g., approaches that do not use service provider interfaces 208), services typically needed to receive information (e.g., service requests) in a format native to the particular service and/or associated datastores. Accordingly, information typically had to be provided in different formats for different services. Alternatively, under other approaches that do not use service provider interfaces 208, the entity providing the request for information, and/or receiving a response to the request for information, had to translate the requests prior to sending the request, and/or translate the responses after they have been sent from the service. The service provider interface 208 may allow information to be provided (e.g., from the requesting entity) to different services in a common format (e.g., based on a uniform access specification and/or service data specifications of the services), and/or may allow information to be provided from the different services in a common format (e.g., based on a uniform access specification and/or service data specifications of the services).

In the example of FIG. 3, the service provider interface 208 includes a service interface component 302, a common interface component 304, a serialization support component 308, an encryption component 310, a file format component 312, and a communication component 314. The service interface component 302 may function to facilitate implementation of uniform access for a particular service 208. While the other components (e.g., components 304-312) of the service provider interface 208 may be common across all of the service provider interfaces 208, the service interface component 302 may be modified for the particular service 208. In some embodiments, services 208 may be implemented and/or managed by different development teams. For example, a usage service 208 may be managed by a usage development team, a subscription service 208 may be managed by a subscription development team, and so forth. The different services 208 may adhere to different service data specifications. For example, a usage service 208 may store and/or access data according to a first format (e.g., data format, access protocols), and a subscription service 208 may store and/or access data according to another format (e.g., another data format, another access protocol). The service interface component 302 may provide the instructions for processing requests received in a common format, and/or providing responses to such requests in a common format. For example, the service interface component 302 may translate requests received according to a common format into a request that can be processed by a service that is formatted according to a specific data specification of that service. More specifically, for example, the common request may include variable for various parameters (e.g., access protocol types, data format types, endpoint locations, and/or the like), and the service interface component 302 may define the values for those variables.

In some embodiments, the service interface component 302 of a service provider interface may be deployed (e.g., to a particular service) with a template service interface component, which may be modified (e.g., by the particular service) based on the service data specification of the particular service.

The common interface component 304 may function to receive information (e.g., service requests) in a common format, and/or provide information (e.g., services request results) in a common format (e.g., to the central controller engine 202). The common interface component 304 may be the same (e.g., having the same source code, object code, machine code, and/or the like) as the common interface components 304 of the other service provider interfaces 208 of the other services 206. In some embodiments, the common interface component 304 may comprise a REST interface. The common interface component 304 may be defined and/or function according to the uniform access specification.

The serialization support component 306 may function to provide serialization and/or deserialization support. The serialization support component 306 may include instructions (e.g., code) to convert one or more objects (e.g., one or more data records, between a sequence of bytes that can be sent through streams). The serialization support component 306 may be the same (e.g., having the same source code, object code, machine code, and/or the like) as the serialization support components 306 of the other service provider interfaces 208 of the other services 206, and may not require any modification (e.g., by the service development team) to function with the associated service 206. The serialization support component 306 may be defined and/or function according to the uniform access specification.

The encryption component 308 may function to encrypt communication with other elements in the multi-tenant system 102. For example, the encryption component 208 may encrypt data imported in the service provider interface 208 and/or data exported from the service provider interface 208. For example, a target location for exported data may require a particular encryption, and the encryption component 308 may ensure data is encrypted properly prior to exporting to the target location. The encryption component 308 may be the same (e.g., having the same source code, object code, machine code, and/or the like) as the encryption components 308 of the other service provider interfaces 208 of the other services 206, and may not require any modification (e.g., by the service development team) to function with the associated service 206. The encryption component 308 may be defined and/or function according to the uniform access specification.

The file format component 310 may function to facilitate data record formatting. For example, the file format component 310 may format data as JSON objects, CSV files, and/or custom types. The file format component 310 may be the same (e.g., having the same source code, object code, machine code, and/or the like) as the file format component 310 of the other service provider interfaces 208 of the other services 206, and may not require any modification (e.g., by the service development team) to function with the associated service 206. The file format component 310 may be defined and/or function according to the uniform access specification.

The communication component 312 may function to receiving and/or provide (e.g., stream, upload) data. For example, the communication component 312 may function to provide data to an S3 bucket. The communication component 312 may be the same (e.g., having the same source code, object code, machine code, and/or the like) as the communication components 312 of the other service provider interfaces 208 of the other services 206, and may not require any modification (e.g., by the service development team) to function with the associated service 206. The communication component 312 may be defined and/or function according to the uniform access specification.

The pagination component 314 may function to generate (or, "write") pages of data records on-the-fly (e.g., in real-time) in response to one or more service requests (e.g., an export request to obtain usage data and/or subscription data). Pages may have a predetermined size-limit (e.g., 4000 records). The pagination component 314 may obtain tenant data 120 from an associated service datastore 114. For example, the service 206 may provide the tenant data 120 as a data stream from the datastore 114 to a service provider interface buffer 316 or 318 in response to a request from the pagination component 314. When a service provider interface buffer 316 or 318 is full, and/or when the service request is satisfied, the pagination component 314 may provide the data from the service provider interface buffer 316 or 318 to the central controller engine 202 (e.g., in response to a fetch request from the central controller engine 202). Data records may be removed from the service provider interface buffers 316 or 318 as they are provided from the service provider interface buffers 316 or 318, and/or they may be removed when receipt is acknowledged by the the central controller engine 202.

In some embodiments, the pagination component 314 functions to generate subsequent pages of data records on-the-fly (e.g., in real-time). In some embodiments, the pagination component 314 generates subsequent pages upon acknowledgement that the previous page was successfully received. Acknowledgements may be explicit or implicit. For example, the central controller engine 202 may send a message indicating that the previous page has been successfully received. In another example, a request for a next page may function as an implicit acknowledgement. In some embodiments, an acknowledgement is not needed, and the pagination component 314 generates subsequent pages when a service provider interface buffer 316 or 318 is full and/or if the service provider interface 208 is transmitting the data records to the central controller engine 202.

In some embodiments, the pagination component 314 may adjust a rate that pages are written. For example, depending on a rate that a receiver (e.g., central controller engine 202) is consuming a first page from a first service provider interface buffer 316, the rate that a second page is written to a second service provider interface buffer 316 may be adjusted. For example, if the receiver is consuming the first page at a relatively slow rate (e.g., based on one or more thresholds), then a stream of data from the datastore 114 of the service 206 to the second service provider interface buffer 316 may be reduced and/or stopped. Alternatively, for example, if the receiver is consuming the first page at a relatively fast rate (e.g., based on one or more thresholds), then the stream of data from the datastore 114 of the service 206 to second service provider interface buffer 316 may be increased.

In some embodiments, the pagination component 314 may adjust the rate of writing pages based on a rate that page(s) are being consumed by a receiver. For example, a writing rate may be initially set based on an expected consumption rate. The pagination component 314 may monitor the actual consumption rate, and adjust the writing rate based on the actual consumption rate. For example, if the actual consumption rate is 20% slower than the expected consumption rate, then the pagination component 314 may reduce the writing rate by 20%.

In some embodiments, the pagination component 314 functions to provide data. For example, the pagination component 314 may provide data in response to a pull (or, fetch) request (e.g., from the central controller engine 202). The pagination component 314 may function to deny requests for data if the requested data is not ready (e.g., the corresponding page is still being written to the service provider interface buffer 316 or 318). If the data is not ready, the pagination component 314 may send a response indicating that the data is not ready for transmission, and/or other status (e.g., indicating a percentage of completion for the page and/or an estimated time until the page is completed).

The pagination component 314 may be the same (e.g., having the same source code, object code, machine code, and/or the like) as the pagination components 314 of the other service provider interfaces 208 of the other services 206, and may not require any modification (e.g., by the service development team) to function with the associated service 206. The pagination component 314 may be defined and/or function according to the uniform access specification.

FIG. 4 depicts a diagram of an example portion 400 of a multi-tenant system 102 enabling real-time pagination and error recovery in a data transmission according to some embodiments. In the example of FIG. 4, the example portion of the multi-tenant system 102 includes a service 206, a service provider interface 208, a datastore 114, a central controller engine 202, and a tenant interface 420. Although only the service 206, the service provider interface 208, and the datastore 114 are shown here, the multi-tenant system 102 may support any number of such services 206, service provider interfaces 208, and/or datastores 114.

The example portion 400 of the multi-tenant system 102 includes a tenant interface 420 coupled to the central controller engine 202, and the central controller engine 202 coupled to the service 206 (e.g., via one or more network devices 204). As stated above, the service 206 manages the one or more datastores 114. The service 206 includes a service provider interface 208 that enables uniform data access and real-time pagination.

The tenant interface 420 may receive a user request (e.g., query) from a user (e.g., tenant administrator). The tenant interface 420 may provide one or more graphical user interfaces (GUIs) for receiving and presenting information (e.g., tenant data 120). In one example, the service 206 may receive a query via the service provider interface 208. The service 206 may generate resulting records 408 (e.g., Records 1 to Record N) in response to the query. The service provider interface 208 may then send the resulting records 408 to the tenant interface 420 via the central controller engine 202.

In a system without the pagination component 314 and the central controller engine 202, the resulting records 408 would be sent to the tenant interface 420 as a continuous data stream. When transferring large amounts of structured data (e.g., lists of records) from a source to a destination, any transfer error (e.g., a lost record or an I/O error) would lead to the continuous data stream being interrupted and restarted from scratch. For large numbers of data records, restarting is a laborious process that is time and resource consuming. Further, at times when the continuous data stream pauses for too long, any associated network devices (e.g., routers, load balancers, firewalls, etc.) may close the connection, causing transmission errors, again requiring the system to restart the data stream.

Some approaches to address this problem may include storing the results in a stable store (e.g., a file system) and giving the requesting tenant interface 420 access (e.g., WebDav). Another approach may be not to stream the data but instead to use store-and-forward process. Another alternative may be to use a reliable transport layer (e.g., a messaging system) and block the server until a record has been stored and acknowledged by the transport layer. These approaches are either extremely resource consuming (storing on file system), difficult to implement (reliable transport layer), and/or operate on a physical data level (e.g., "byte level").

In some embodiments, the pagination component 314 and the central controller engine 202 operate in a manner that effectively splits the data transmission into sets of records on the fly (e.g., in real-time). The pagination component 314 and the central controller engine 202 may reverse the responsibility for the data transmission from a push (e.g., where a server sends the resulting records to a client) to a pull (e.g., where a client fetches each record set from a server). Accordingly, the pagination component 314 may make each record set available (e.g., in the first service provider interface buffer 316) until the central controller engine 202 signals successful transfer of the record set, and then readies the next record set (e.g., in the second service provider interface buffer 318), and so forth, until the entire data transmission is exhausted. This process is resource efficient because, for example, only a single record may need to be held available at any given time. The multi-tenant system 102 may leverage structured data to provide each record set over an arbitrary low-level byte count. This approach can be resilient to transmission (or, transport) errors, for example, because any error can cause the current record set to be re-sent until transmission succeeds (e.g., without having to re-start the entire data transmission). Furthermore, because the resulting records may be sent in smaller chunks (or, pages), any associated network devices are less apt to close the network connections.

In the example of FIG. 4, the central controller engine 202 includes a data fetching component 410, an error handling component 412 and a data management component 414. In some embodiments, the pagination component 314 informs the central controller engine 202 that a first record set is available. The data fetching component 410 may initiate a pull of the first record set. The error handling component 412 may monitor for errors. In some embodiments, the error handling component 412 may identify errors dynamically (e.g., as it is being received). In some embodiments, the error handling component 412 may identify errors upon completion of receipt of the first record set. If the error handling component 412 identifies an error, the error handling component 412 may inform the data fetching component 410 to reinitiate transfer of the first record set. If the error handling component 412 identifies no error, the error handling component 412 may inform the data fetching component 410 that it may initiate pulling the second record set and may inform the data management component 414 to forward the data to the tenant interface 420. The data management component 414 may clean the data (e.g., remove any headers or footers) and may forward the data to the tenant interface 420 as a continuous data stream.

In some embodiments, while the data management component 414 is forwarding the data transmission (e.g., data stream) to the tenant interface 420 or, in other embodiments, after the data management component 414 has completed providing the data transmission to the tenant interface 420, the data fetching component 410 may inform the pagination component 314 that it is ready to pull the next record set. The pagination component 314 may replace the first record set (e.g., in a service provider interface buffer 316 or 318) with the second set of records. In some embodiments, the data fetching component 410 may obtain some information from the first record set to inform the pagination component 314 which record set is next. The data fetching component 410 may then begin to receive the next (e.g., second) record set. The process may repeat until the last record set of the resulting records 408 is received. Notably, the data fetching component 410 may detect that it has received the last record set either from information the pagination component 314 placed in the last record set (e.g., in the header or footer), or because the pagination component 314 informs the data fetching component 410 in response to a success flag the pagination component 314 receives from the data fetching component 410 indicating that the last record set was successfully received or in response to a request from the data fetching component 410 for another record set.

In some embodiments, the data fetching component 410 functions to pull (or, fetch) pages from the service provider interface. For example, the central controller engine 202 may periodically provide a request to the service provider interface 208. If a service provider interface buffer 316 or 318 is full (e.g., the page has been completely written), and/or if the service request has been satisfied (e.g., all of the usage data has been obtained from the datastore, and all of the usage data amounts to less than a full page), the service provider interface 208 may provide the data from the service provider interface buffer 316 or 318 to the central controller engine 202 for storage (e.g., in the controller datastore 203).

In some embodiments, the data fetching component 410 may provide a fetch request to the service provider interface 208 based on a previously received page. For example, a previously received page may include an identifier, such as a uniform resource identifier (URI), that identifies a particular of the next page location (e.g., a URI of the second service provider interface buffer 318). The request to receive the next page may function as the acknowledgement (e.g., an implicit acknowledgement) that the previous page was successfully received.

In some embodiments, the error handling component 412 functions to identify errors in a data transmission. If an error occurs, for example, in the data transmission of a second page of records between the service provider interface 208 and the central controller engine 202, the error handling component 412 may reinitiate transmission of the second page of records, as opposed to the beginning of the data transmission (e.g., the first page of records). This may be allowed, for example, because the pages are written in real-time (e.g., as opposed to pre-generated).

FIG. 5A depicts a diagram of example paginated record sets 500 ready for transmission to a central controller engine 202 of a multi-tenant system 102 according to some embodiments.

The paginated record sets 500 include a first page 502, a second page 504, a third page 506, additional pages 508, and a last page ("Page X") 510. Each page includes a data record set. For example, the first page 502 includes a first data record set 512, the second page 504 includes a second data record set 514, the third page 506 includes a third data record set 516, and the last page ("Page X") 510 includes a last data record set 518 ("Data Record Set X"). Each page may also include a header and/or footer that provides additional information for supporting paginated data transmission. For example, the first page 502 includes a first header 520, the second page 504 includes a second header 522, the third page 506 includes a third header 524, and the last page ("Page X") 510 includes a last header 526. In some embodiments, no header or footer is needed. The headers and/or footers may include identifiers for obtaining a next page. For example, the page 502 may include a footer 520 including a URI of a first service provider interface buffer 316, the page 512 may include a footer 522 including a URI of a second service provider interface buffer 318, the page 506 may include a footer 524 including a URI of the first service provider interface buffer 316, and so forth.

FIG. 5B depicts a flowchart of an example of a method 530 of real-time paginated record transmission in a multi-tenant system according to some embodiments. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

The central controller engine 202 is coupled to a service provider interface 208 via network devices, (e.g., a firewall 204*a* and router a 204*b*). The flowchart 530 begins in step 532 with the central controller engine 202 sending a request to create a data transmission (e.g., a data stream). The service provider interface 208 in step 534 prepares a ready response. The central controller engine 202 in step 536 requests a first page be fetched. The service provider interface 208 in step 538 sends a first page of data (e.g., 4000 records) and sends information for the next page. The central controller engine 202 in step 540 requests the next page (e.g., which may be an indication that no errors occurred in the transmission of the first page, and/or an acknowledgement of successful receipt of the first page). The service provider interface 208 in step 542 sends the next page of data (e.g., 4000 records) and sends information for the next page. The central controller engine 202 in step 544 requests another page be fetched. The service provider interface 208 in step 546 sends an end marker (e.g., which is an indication that no more pages are in the data stream).

FIGS. 6A-C depict a flowchart of an example of a method 600 of real-time paginated record transmission in a multi-tenant system according to some embodiments. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 602, a multi-tenant system (e.g., multi-tenant system 102) receives a user request (e.g., export request, import request) to perform one or more service requests (e.g., export usage data, export subscription data) associated with user data (e.g., tenant data 120). The user data may include first data (e.g., usage data of the tenant data 120). In some embodiments, a tenant interface (e.g., tenant interface 120) receives the user request from a user (e.g., a tenant user), and provides the request to a central controller engine (e.g., central controller engine 202). In some embodiments, a data management component (e.g., data management component 414) of the central controller engine receives the user request from the tenant interface.

In step 604, the multi-tenant system selects, based on the user request, a first service provider interface (e.g., first service provider interface 208) integrated into a first service (e.g., a usage service 206). The first service provider interface may be configured to operate on the first data in a first datastore (e.g., a usage service datastore 114) associated with the first service. The first SPI may include a common pagination component (e.g., pagination component 314) configured to obtain and buffer the first data from the first datastore into a first buffer (e.g., first service provider interface buffer 316) of the first service provider interface. As used herein, a "common" component may be a component that is the same for each of the service provider interfaces of the different services of the multi-tenant system 102. In some embodiments, the central controller engine selects the first service provider interface. In some embodiments, a job invocation component (e.g., job invocation component 202a) of the central controller engine selects the first service provider interface.

In step 606, the multi-tenant system obtains, based on a first service request (e.g., export usage data of the tenant data 120) of the one or more service requests, a first page (e.g., page 502) of records (e.g., first set of data records 512) of the first data from the first datastore. As used herein, "pages" may be structures (e.g., data structures, logical structures) generated by the common pagination component. In some embodiments, the first service pushes (e.g., streams) the first data from the first datastore to the first service provider interface (e.g., in response to a request from the first service provider interface, and/or in response to the first data being written to the first datastore). In some embodiments, the common pagination component of the first service provider interface obtains the first page of records.

In step 608, the multi-tenant system buffers the first page of records in the first buffer of the first service provider interface as the records of the first page of records are being obtained from the first datastore (e.g., in real-time). Buffered data may be temporarily stored (e.g., until receipt of that data by the central controller engine is acknowledged). In some embodiments, the common pagination component of the first service provider interface buffers the first page of records.

In step 610, the multi-tenant system provides the first page of records of the first data to the central controller engine. In some embodiments, the common pagination component provides the first page of records from the first service provider interface buffer to a datastore (e.g., controller datastore 203) of the central controller engine in response to a pull (or, fetch) request initiated by the central controller engine. For example, the common pagination component of the first service provider interface may satisfy the fetch request if the first buffer of the first service provider interface is full (e.g., the first page has been written) and/or the first service request has been fulfilled. Otherwise, the first service provider interface may return a response indicating that the page is not ready to be sent.

In step 612, the multi-tenant system stores the first page of records of the first data. In some embodiments, the central controller engine stores the first page of records of the first data in the datastore of the central controller engine. In some embodiments, a data management component (e.g., data management component 414) of the central controller engine stores the first page of records of the first data in the datastore of the central controller engine.

In step 614, the multi-tenant system provides the first page of records of the first data to a user (e.g., tenant user). In some embodiments, the data management component provides (e.g., streams, uploads, downloads) the first page of records of the first data to a user (e.g., via the tenant interface).

In step 616, the multi-tenant system obtains, based on the first service request of the one or more service requests, a second page (e.g., second page 504) of records (e.g., second data record set 514) of the first data from the first datastore. In some embodiments, the common pagination component of the first service provider interface obtains the second page of records of the first data. In some embodiments, the first service pushes (e.g., streams) the first data from the first datastore to the first service provider interface (e.g., in response to a request from the first service provider interface, and/or in response to the first data being written to the first datastore). In some embodiments, the common pagination component of the first service provider interface obtains the second page of records.

In step 618, the multi-tenant system buffers the second page of records in a second buffer of the first service provider interface as the records of the second page of records are being obtained from the first datastore (e.g., in real-time). As used herein, buffered data may be temporarily stored (e.g., until receipt of that data by the central controller engine is acknowledged). In some embodiments, the common pagination component of the first service provider interface buffers the second page of records.

In step 620, the multi-tenant system provides the second page of records of the first data to the central controller engine. In some embodiments, the common pagination component provides the second page of records from the first service provider interface buffer to the datastore of the central controller engine in response to a pull (or, fetch) request initiated by the central controller engine. In some embodiments, the fetch is based on an identifier (e.g., a URI) of the second service provider interface buffer. The identifier may included in the first page records. The first page of records may include a URI of the second service provider interface buffer. For example, the last entry in the first page of records may be the identifier.

In step 622, the multi-tenant system stores the second page of records of the first data. In some embodiments, the central controller engine stores the second page of records of the first data in the datastore of the central controller engine. In some embodiments, the data management component stores the second page of records of the first data in the datastore of the central controller engine.

In step 624, the multi-tenant system provides the second page of records of the first data to the user. In some embodiments, the communication component of the central controller engine provides (e.g., streams, uploads, downloads) the second page of records of the first data to the user (e.g., via the tenant interface).

In step 626, the multi-tenant system selects, based on the user request, a second service provider interface (e.g., a second service provider interface 208) integrated into a second service (e.g., a subscription service 206). The second service provider interface may be configured to operate on the second data in a second datastore (e.g., a subscription service datastore 114) associated with the second service. The second service provider interface may include the common pagination component configured to obtain and buffer the second data from the second datastore into a second buffer (e.g., second service provider interface buffer 316) of the second service provider interface. In some embodiments, the central controller engine selects the second service provider interface. In some embodiments, the job invocation component of the central controller engine selects the second service provider interface.

In step 628, the multi-tenant system obtains, based on a second service request (e.g., export subscription data of the tenant data 120) of the one or more service requests, a first page of records of second data of the user data from the second datastore. In some embodiments, the second service pushes (e.g., streams) the second data from the second datastore to the second service provider interface (e.g., in response to a request from the second service provider interface, and/or in response to the second data being written to the second datastore). In some embodiments, the common pagination component of the second service provider interface obtains the first page of records of the second data.

In step 630, the multi-tenant system buffers the first page of records of the second data in the first buffer of the second service provider interface as the records of the first page of records of the second data are being obtained from the second datastore (e.g., in real-time). In some embodiments, the common pagination component of the second service provider interface buffers the first page of records of the second data in the first buffer of the second service provider interface.

In step 632, the multi-tenant system provides the first page of records of the second data to the central controller engine. In some embodiments, the common pagination component of the second service provider interface provides the first page of records of the second data from the first buffer of the second service provider interface to the datastore of the central controller engine in response to a pull (or, fetch) request initiated by the central controller engine. For example, the common pagination component of the second service provider interface may satisfy the fetch request if the first buffer of the second service provider interface is full (e.g., the first page has been written) and/or the second service request has been fulfilled. Otherwise, the second service provider interface may return a response indicating that the page is not ready to be sent.

In step 634, the multi-tenant system stores the first page of records of the second data. In some embodiments, the data management component of the central controller engine stores the first page of records of the second data in the datastore of the central controller engine.

In step 636, the multi-tenant system provides the first page of records of the first data to the user. In some embodiments, the data management component of the central controller engine provides (e.g., streams, uploads, downloads) the first page of records of the second data to the user (e.g., via the tenant interface).

FIG. 7 depicts a diagram 700 of an example of a computing device 702. Any of the systems, engines, datastores, and/or networks described herein may comprise an instance of one or more computing devices 702. In some embodiments, functionality of the computing device 702 is improved to the perform some or all of the functionality described herein. The computing device 702 comprises a processor 704, memory 706, storage 708, an input device 710, a communication network interface 712, and an output device 714 communicatively coupled to a communication channel 716. The processor 704 is configured to execute executable instructions (e.g., programs). In some embodiments, the processor 704 comprises circuitry or any processor capable of processing the executable instructions.

The memory 706 stores data. Some examples of memory 706 include storage devices, such as RAM, ROM, RAM cache, virtual memory, etc. In various embodiments, working data is stored within the memory 706. The data within the memory 706 may be cleared or ultimately transferred to the storage 708.

The storage 708 includes any storage configured to retrieve and store data. Some examples of the storage 708 include flash drives, hard drives, optical drives, cloud storage, and/or magnetic tape. Each of the memory system 706 and the storage system 708 comprises a computer-readable medium, which stores instructions or programs executable by processor 704.

The input device 710 is any device that inputs data (e.g., mouse and keyboard). The output device 714 outputs data (e.g., a speaker or display). It will be appreciated that the storage 708, input device 710, and output device 714 may be optional. For example, the routers/switchers may comprise the processor 704 and memory 706 as well as a device to receive and output data (e.g., the communication network interface 712 and/or the output device 714).

The communication network interface 712 may be coupled to a network (e.g., network 108) via the link 718. The communication network interface 712 may support communication over an Ethernet connection, a serial connection, a parallel connection, and/or an ATA connection. The communication network interface 712 may also support wireless communication (e.g., 802.11 a/b/g/n, WiMax, LTE, WiFi). It will be apparent that the communication network interface 712 may support many wired and wireless standards.

It will be appreciated that the hardware elements of the computing device 702 are not limited to those depicted in FIG. 7. A computing device 702 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 704 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A computing system comprising:
one or more processors; and
memory storing instructions that, when executed by the one or more processors, cause the computing system to perform:
receiving, by a central controller engine, a request associated with user data, the user data including first data, the request including a request to stream the first data to a user device, the first data including a set of records;
selecting, by the central controller engine based on the request, a first service provider interface (SPI) integrated into a first service, the first SPI being configured to operate on the first data in a first datastore associated with the first service, the first SPI including a common pagination component configured to obtain the first data as a data stream from the first datastore, buffer a first page of records of the first data as received into a first buffer of the first SPI, the first page of records of the first data being a first portion of the first set of records, and buffer a second page of records of the first data as received into a second buffer of the first SPI, the second page of records of the first data being a second portion of the first set of records;
obtaining, by the common pagination component of the first SPI, the first page of records of the first data as a data stream from the first datastore;
buffering, by the common pagination component of the first SPI, the first page of records of the first data in the first buffer as the records of the first page of records of the first data are being streamed from the first datastore;
buffering, by the common pagination component of the first SPI, the second page of records of the first data in the second buffer as the records of the second page of records of the first data are being streamed from the first datastore;
providing, by the common pagination component of the first SPI, the first page of records of the first data to the central controller engine;
receiving, by the central controller engine, the first page of records of the first data;
informing, by the central controller engine, the first SPI when the first page of records of the first data has been fully received to inform the first SPI that it can begin providing the second page of records of the first data to the central controller engine;
storing, by the central controller engine, the first page of records of the first data; and
providing, by the central controller engine, the first page of records of the first data as a data stream to the user device.

2. The computing system of claim 1, wherein the first page of records of the first data is provided to the central controller engine by the common pagination component of the first SPI in response to a first fetch request from the central controller engine.

3. The computing system of claim 1, wherein the instructions further cause the system to perform:
providing, by the common pagination component of the first SPI, the second page of records of the first data to the central controller engine in response to the central controller engine informing the first SPI that the first page of records of the first data has been fully received;
storing, by the central controller engine, the second page of records of the first data; and
providing, by the central controller engine, the second page of records of the first data as a data stream to the user.

4. The computing system of claim 3, wherein the second page of records of the first data is provided to the central controller engine by the common pagination component of the first SPI in response to a second fetch request from the central controller engine.

5. The computing system of claim 3, wherein the providing the second page of records of the first data is based on an identifier of the second buffer of the first SPI, the identifier being included in the first page of records of the first data.

6. The computing system of claim 1, wherein the obtaining the first page of records of the first data from the first datastore comprises:
pushing, by the first service, the first page of records of the first data from the first datastore to the first buffer of the first SPI.

7. The system of claim 1, wherein the providing the first page of records of the first data to the central controller engine comprises:
pulling, by the central controller engine, the first page of records of the first data from the first buffer of the first SPI to a datastore of the central controller engine.

8. The computing system of claim 3, wherein the instructions further cause the system to perform:
detecting an error associated with the second page of records of the first data; and
reinitiating the providing, by the common pagination component of the first SPI, the second page of records of the first data to the central controller engine.

9. The computing system of claim 1, wherein the user data includes second data, and wherein the instructions further cause the system to perform:
selecting, by the central controller engine based on the request, a second SPI integrated into a second service, the second SPI being configured to operate on the second data in a second datastore associated with the second service, the second SPI including the common pagination component configured to obtain the second data as a data stream from the second datastore, buffer a first page of records of the second data as received into a first buffer of the second SPI, the first page of records of the second data being a third portion of the first set of records, and buffer a second page of records of the second data as received into a second buffer of the second SPI, the second page of records of the second data being a fourth portion of the first set of records;
obtaining, by the common pagination component of the SPI, a first page of records of the second data as a data stream from the second datastore;
buffering, by the common pagination component of the second SPI, the first page of records of the second data in the first buffer of the second SPI as the records of the first page of records of the second data are being streamed from the second datastore;
buffering, by the common pagination component of the second SPI, the second page of records of the second data in the second buffer as the records of the second page of records of the second data are being streamed from the second datastore;
providing, by the common pagination component of the second SPI, the first page of records of the second data to the central controller engine;
storing, by the central controller engine, the first page of records of the second data; and
providing, by the central controller engine, the first page of records of the second data as a data stream to the user.

10. A method being implemented by a computing system including one or more physical processors and storage media storing machine-readable instructions, the method comprising:
receiving, by a central controller engine, a request associated with user data, the user data including first data, the request including a request to stream the first data to a user device, the first data including a set of records;
selecting, by the central controller engine based on the request, a first service provider interface (SPI) integrated into a first service, the first SPI being configured to operate on the first data in a first datastore associated with the first service, the first SPI including a common pagination component configured to obtain the first data as a data stream from the first datastore, buffer a first page of records of the first data as received into a first buffer of the first SPI, the first page of records of the first data being a first portion of the first set of records, and buffer a second page of records of the first data as received into a second buffer of the first SPI, the second page of records of the first data being a second portion of the first set of records;
obtaining, by the common pagination component of the first SPI, the first page of records of the first data as a data stream from the first datastore;
buffering, by the common pagination component of the first SPI, the first page of records of the first data in the first buffer as the records of the first page of records of the first data are being streamed from the first datastore;
buffering, by the common pagination component of the first SPI, the second page of records of the first data in the second buffer as the records of the second page of records of the first data are being streamed from the first datastore;
providing, by the common pagination component of the first SPI, the first page of records of the first data to the central controller engine;
receiving, by the central controller engine, the first page of records of the first data;
informing, by the central controller engine, the first SPI when the first page of records of the first data has been fully received to inform the first SPI that it can begin providing the second page of records of the first data to the central controller engine;
storing, by the central controller engine, the first page of records of the first data; and
providing, by the central controller engine, the first page of records of the first data as a data stream to the user device.

11. The method of claim 10, wherein the first page of records of the first data is provided to the central controller engine by the common pagination component of the first SPI in response to a first fetch request from the central controller engine.

12. The method of claim 10, further comprising:
providing, by the common pagination component of the first SPI, the second page of records of the first data to the central controller engine in response to the central controller engine informing the first SPI that the first page of records of the first data has been fully received;
storing, by the central controller engine, the second page of records of the first data; and
providing, by the central controller engine, the second page of records of the first data as a data stream to the user.

13. The method of claim 12, wherein the second page of records of the first data is provided to the central controller engine by the common pagination component of the first SPI in response to a second fetch request from the central controller engine.

14. The method of claim 12, wherein the providing the second page of records of the first data is based on an identifier of the second buffer of the first SPI, the identifier being included in the first page of records of the first data.

15. The method of claim 10, wherein the obtaining the first page of records of the first data from the first datastore comprises:
pushing, by the first service, the first page of records of the first data from the first datastore to the first buffer of the first SPI.

16. The method of claim 10, wherein the providing the first page of records of the first data to the central controller engine comprises:

pulling, by the central controller engine, the first page of records of the first data from the first buffer of the first SPI to a datastore of the central controller engine.

17. The method of claim 10, further comprising:

selecting, by the central controller engine based on the request, a second SPI integrated into a second service, the second SPI being configured to operate on the second data in a second datastore associated with the second service, the second SPI including the common pagination component configured to obtain the second data as a data stream from the second datastore, buffer a first page of records of the second data as received into a first buffer of the second SPI, the first page of records of the second data being a third portion of the first set of records, and buffer a second page of records of the second data as received into a second buffer of the second SPI, the second page of records of the second data being a fourth portion of the first set of records;

obtaining, by the common pagination component of the SPI, a first page of records of the second data as a data stream from the second datastore;

buffering, by the common pagination component of the second SPI, the first page of records of the second data in the first buffer of the second SPI as the records of the first page of records of the second data are being streamed from the second datastore;

buffering, by the common pagination component of the second SPI, the second page of records of the second data in the second buffer as the records of the second page of records of the second data are being streamed from the second datastore;

providing, by the common pagination component of the second SPI, the first page of records of the second data to the central controller engine;

storing, by the central controller engine, the first page of records of the second data; and providing, by the central controller engine, the first page of records of the second data as a data stream to the user.

18. A non-transitory computer readable medium comprising instructions that, when executed, cause one or more processors to perform:

receiving, by a central controller engine, a request associated with user data, the user data including first data, the request including a request to stream the first data to a user device, the first data including a set of records;

selecting, by the central controller engine based on the request, a first service provider interface (SPI) integrated into a first service, the first SPI being configured to operate on the first data in a first datastore associated with the first service, the first SPI including a common pagination component configured to obtain the first data as a data stream from the first datastore, buffer a first page of records of the first data as received into a first buffer of the first SPI, the first page of records of the first data being a first portion of the first set of records, and buffer a second page of records of the first data as received into a second buffer of the first SPI, the second page of records of the first data being a second portion of the first set of records;

obtaining, by the common pagination component of the first SPI, the first page of records of the first data as a data stream from the first datastore;

buffering, by the common pagination component of the first SPI, the first page of records of the first data in the first buffer as the records of the first page of records of the first data are being streamed from the first datastore;

buffering, by the common pagination component of the first SPI, the second page of records of the first data in the second buffer as the records of the second page of records of the first data are being streamed from the first datastore;

providing, by the common pagination component of the first SPI, the first page of records of the first data to the central controller engine;

receiving, by the central controller engine, the first page of records of the first data;

informing, by the central controller engine, the first SPI when the first page of records of the first data has been fully received to inform the first SPI that it can begin providing the second page of records of the first data to the central controller engine;

storing, by the central controller engine, the first page of records of the first data; and providing, by the central controller engine, the first page of records of the first data as a data stream to the user device.

19. The non-transitory computer readable medium of claim 18 comprising further instructions that, when executed, cause one or more processors to perform:

selecting, by the central controller engine based on the request, a second SPI integrated into a second service, the second SPI being configured to operate on the second data in a second datastore associated with the second service, the second SPI including the common pagination component configured to obtain the second data as a data stream from the second datastore, buffer a first page of records of the second data as received into a first buffer of the second SPI, the first page of records of the second data being a third portion of the first set of records, and buffer a second page of records of the second data as received into a second buffer of the second SPI, the second page of records of the second data being a fourth portion of the first set of records;

obtaining, by the common pagination component of the SPI, a first page of records of the second data as a data stream from the second datastore;

buffering, by the common pagination component of the second SPI, the first page of records of the second data in the first buffer of the second SPI as the records of the first page of records of the second data are being streamed from the second datastore;

buffering, by the common pagination component of the second SPI, the second page of records of the second data in the second buffer as the records of the second page of records of the second data are being streamed from the second datastore;

providing, by the common pagination component of the second SPI, the first page of records of the second data to the central controller engine;

storing, by the central controller engine, the first page of records of the second data; and providing, by the central controller engine, the first page of records of the second data as a data stream to the user.

* * * * *